(12) United States Patent
Perone et al.

(10) Patent No.: US 10,860,745 B2
(45) Date of Patent: Dec. 8, 2020

(54) SECURING DATA

(71) Applicant: Hewlett-Packard Development Company, L.P., Houston, TX (US)

(72) Inventors: Christian Perone, Porto Alegre (BR); Diego Medaglia, Porto Alegre (BR); Wagston Staehler, Porto Alegre (BR); Craig Walrath, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 70 days.

(21) Appl. No.: 15/779,497

(22) PCT Filed: Mar. 8, 2016

(86) PCT No.: PCT/US2016/021375
§ 371 (c)(1),
(2) Date: May 25, 2018

(87) PCT Pub. No.: WO2017/155516
PCT Pub. Date: Sep. 14, 2017

(65) Prior Publication Data
US 2018/0349646 A1 Dec. 6, 2018

(51) Int. Cl.
*G06F 21/72* (2013.01)
*G06F 21/60* (2013.01)
*G06F 21/78* (2013.01)
*G06F 1/30* (2006.01)
*G06F 11/14* (2006.01)
*G06F 11/20* (2006.01)

(52) U.S. Cl.
CPC ........... *G06F 21/72* (2013.01); *G06F 1/30* (2013.01); *G06F 11/1441* (2013.01); *G06F 11/2015* (2013.01); *G06F 21/60* (2013.01); *G06F 21/78* (2013.01)

(58) Field of Classification Search
CPC .. G06F 21/72; G06F 11/2015; G06F 11/1441; G06F 1/30; G06F 21/78; G06F 21/60
USPC ........................................................ 713/189
See application file for complete search history.

(56) References Cited

U.S. PATENT DOCUMENTS 5,515,540 A * 5/1996 Grider .................... G06F 21/75
726/33
8,266,431 B2 * 9/2012 Parlan ................... H04L 9/0894
713/168
(Continued)

FOREIGN PATENT DOCUMENTS

EP 2466465 A2 6/2012

OTHER PUBLICATIONS

"Cryptographic Module in Snapdragon 805 is FIPS 140-2 Certified"; Nov. 8, 2014; https://www.qualcomm.com/news/snapdragon/2014/11/07/cryptographic-module-snapdrag.
(Continued)

*Primary Examiner* — Taghi T Arani
*Assistant Examiner* — Badri Champakesan
(74) *Attorney, Agent, or Firm* — Trop Pruner & Hu PC

(57) ABSTRACT

Examples of a system and method for securing data on a computing device are described herein. One or more cryptographic operations are executed on at least a portion of data stored in a memory module of the computing device in response to a change of operational state of the system from a first operational state to a second operational state.

19 Claims, 4 Drawing Sheets

(56) References Cited

U.S. PATENT DOCUMENTS

| | | | | | |
|---|---|---|---|---|---|
| 8,281,388 | B1* | 10/2012 | Sobel | | G06F 21/78 |
| | | | | | 726/16 |
| 8,924,743 | B2* | 12/2014 | Conte | | G06F 12/1408 |
| | | | | | 713/193 |
| 9,342,713 | B2* | 5/2016 | Ali | | G06F 21/81 |
| 9,459,805 | B2* | 10/2016 | McKelvie | | G06F 11/2015 |
| 2004/0003273 | A1* | 1/2004 | Grawrock | | G06F 21/57 |
| | | | | | 713/193 |
| 2005/0044433 | A1* | 2/2005 | Dunstan | | H04N 21/4353 |
| | | | | | 713/320 |
| 2006/0059372 | A1* | 3/2006 | Fayar | | G06F 21/72 |
| | | | | | 713/192 |
| 2008/0288771 | A1* | 11/2008 | Kulakowski | | H04L 9/16 |
| | | | | | 713/150 |
| 2009/0169007 | A1* | 7/2009 | Vasicheck | | H04L 63/0428 |
| | | | | | 380/255 |
| 2010/0153752 | A1* | 6/2010 | Tsukamoto | | G06F 21/81 |
| | | | | | 713/300 |
| 2011/0252248 | A1* | 10/2011 | Cameron | | G06Q 10/04 |
| | | | | | 713/300 |
| 2012/0191982 | A1* | 7/2012 | Levin | | G06F 21/78 |
| | | | | | 713/189 |
| 2012/0254623 | A1* | 10/2012 | Sathath | | G06F 21/602 |
| | | | | | 713/183 |
| 2013/0322618 | A1* | 12/2013 | Coleridge | | H04L 9/0662 |
| | | | | | 380/44 |
| 2014/0006799 | A1* | 1/2014 | Zmudzinski | | G06F 1/3243 |
| | | | | | 713/189 |
| 2014/0006805 | A1* | 1/2014 | Colp | | G06F 12/1425 |
| | | | | | 713/193 |
| 2014/0304505 | A1* | 10/2014 | Dawson | | H04L 63/0428 |
| | | | | | 713/165 |
| 2014/0310532 | A1* | 10/2014 | Ali | | G06F 12/1408 |
| | | | | | 713/189 |
| 2015/0121089 | A1* | 4/2015 | Kirikova | | G06F 21/6209 |
| | | | | | 713/193 |
| 2015/0286813 | A1* | 10/2015 | Jakobsson | | G06F 21/35 |
| | | | | | 726/9 |
| 2016/0048825 | A1* | 2/2016 | Swamy | | G06Q 20/3674 |
| | | | | | 705/67 |
| 2016/0217304 | A1* | 7/2016 | Ali | | H04L 9/3242 |
| 2016/0267279 | A1* | 9/2016 | Catalano | | H04L 63/0435 |

OTHER PUBLICATIONS

"Intel® Raid: Drive Encryption Management"; http://blog.arvutid.ee/wp-content/uploads/2011/09/Intel_RAID_Drive_Encryption_Managen.

David G. Ries et al.; "Encryption Made Simple for Lawyers"; Nov./Dec. 2012; http://www.americanbar.org/publications/gp_solo/2012/november_december2012privacya.

"Cryptographic Module in Snapdragon 805 is FIPS 140-2 Certified," Qualcomm OnQ Blog (Nov. 7, 2014). Available at:https://www.qualcomm.com/news/onq/2014/11/07/crypto- graphicmodule-snapdragon-805-fips-140-2-certified.

"Intel® Raid: Drive Encryption Management," Intel Product Brief (2010). Available at: http://blog.arvutid.ee/wp-content/uploads/2011/09/Intel_RAID_Drive_Encryption_Management.pdf.

Ries, D. G. et al. "Encryption Made Simple for Lawyers." GPSolo 29 (2012): 18.

* cited by examiner

SECURING DATA

BACKGROUND

Securing data on a computing device presents a number of challenges. Data may be secured "in-transit" during the operation of the device or "at-rest" when the data is static in the memory of the device. Typically, securing data-in-transit is a costly operation requiring encryption and decryption of data being written on and read from a memory of the device. Non-volatile memory stores data when the device is powered-down and consequently presents its own security challenges.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
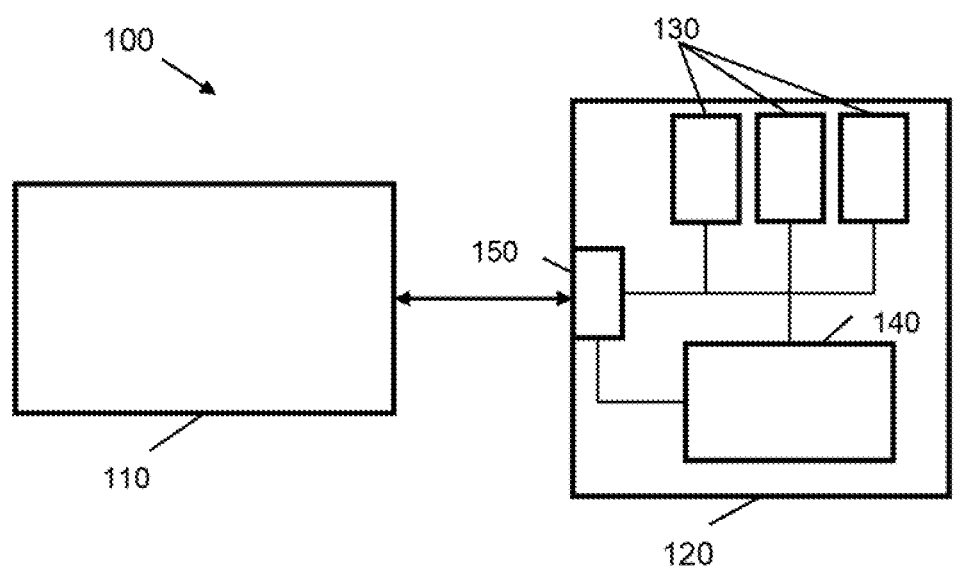
FIG. 1 is a schematic diagram of a system for securing data stored in a memory module according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein provide methods and systems for securing data received from a computing device. Common methods of securing data accessed by a computing device, such as encryption and authentication methods, can be deployed in a number of different contexts depending on the security requirements of the computing device. In one example, data is encrypted in transit. A computing device comprises an on-board cryptographic hardware module and/or software dedicated to securing read and write accesses to a memory of the computing device. In another case, data is secured in long term storage at rest when the device is powered down. For example, a computing device may be coupled to a storage device which provides bulk data encryption. When the computing device is powered down or, alternatively, at a user's request, the data on the storage device is encrypted. The data is decrypted when the computing device requests access to the data again, such as when the device is powered up, for example, given appropriate authorization and/or user credentials. In the case of security for data-in-transit, the perceived security threat is that of an aggressor capable of probing the microprocessor or the memory components thereof during the execution of an application on the computing device. This is a high level of security and, as such, the trade off with the performance of the device typically is significant in real applications. In particular, executing cryptographic operations for every read and write access is expensive in terms of time-of-execution and also in terms of power consumption, for example. In the latter example, of securing data-at-rest, one security threat is in the form of an aggressor which is for example capable of stealing a hard drive from a computer. For a device with data-at-rest encryption for storage, the security of data is guaranteed in the event the storage component is stolen and the encryption algorithm applied to the data is secure. However the security of data-in-transit during read and write operations to memory, when the device is in use, is not guaranteed. Moreover, it is inefficient to read and write data to a hard disk when the device is in use. Hence the data may remain unencrypted during operation of the computing device.

In recent years traditional hard disk drive (HDD) based storage in computing devices has been augmented with and even replaced by relatively faster, solid state memory. The memory may be arranged into modules that are embedded in computing devices or into standalone devices, such as memory cards, USB flash drives and solid state drives, which may for example be connected to and disconnected from computing devices. Such memory devices include flash memory—a form of non-volatile memory based on Electrically Erasable Programmable Read-Only Memory (EEPROM). Flash memory, for example, has the drawback of only being able to tolerate a limited number of write cycles before the memory begins to deteriorate. Moreover, flash memory stores data in blocks of bytes and is not byte-addressable. For these reasons, flash memory is typically best suited as a secondary storage. On the other hand, other forms of non-volatile memory have begun to become a viable replacement for primary volatile memory such as static and dynamic Random Access Memory (SRAM/DRAM). Examples include Magnetoresistive RAM (MRAM), Ferroelectric RAM (FRAM), battery-backed SRAM, battery-backed DRAM, resistive RAM (RRAM, based on memristors) and Phase-Change RAM (PCRAM). These forms of memory have the advantage of both being non-volatile, retaining data when a device is in a powered-down state, and also as a form of primary memory which data may be directly written to and read from during operation of the respective computing device. In particular, these forms of memory can be byte-addressable. These forms of non-volatile memory can be seen to be working towards a form of universal memory with the most desirable properties of earlier forms of memory but without certain perceived disadvantages thereof.

From a security perspective non-volatile memory may be perceived as disadvantageous in certain applications as the data persists in memory even when the memory does not have access to a power source. For example, in the case of session keys used in web-based browsing activity on a device, it may in fact be desirable to store the keys and other sensitive data in volatile memory. However, as previously identified, the present techniques are either directed towards encrypting all read/write operations to memory, which has performance drawbacks versus long term storage bulk-encryption methods, and which, while providing a high level of security, are often designed for storage devices which store data in blocks of bytes. Moreover, the in-line encryption methods which encrypt data-in-transit are based on a strong attack model which requires an aggressor to have full access to the device during operations. As newer forms of byte-addressable, non-volatile memory replace existing memory, a solution between these two extremes is desirable.

Methods and systems described herein provide a means of securing data stored in memory when a computing device accessing the memory is in a relatively low powered state. In an example, a system comprising a computing device and a non-volatile memory module changes operational state from a first operational state to a second operational state. In response to the change of operational state, a cryptographic engine coupled to one or more non-volatile memory cells in the non-volatile memory module may be arranged to execute one or more cryptographic operations on the data that is stored in the non-volatile memory cells.

In certain examples described herein, the operational states of the system comprise the power states of the computing device. For example, a first operational state of the computing device may be "powered on", in which the computing device may be executing read and write operations to the non-volatile memory cells. A second operational state may then be "powered off" in which the device no longer performs read and write operations, respectively, from or to the non-volatile memory cells.

In this scenario, the cryptographic engine may be arranged to detect when the computing device moves to and/or is in a relatively lower powered (for example, powered off) state. In certain examples described herein, during the first operational state the non-volatile memory may be powered by the computing device itself, which has and/or acts as a first power source. In the second operational state, however, the non-volatile memory and the cryptographic engine may be provided with and/or powered by a second power source. By providing a second power source for the cryptographic engine it is possible to execute cryptographic operations independently of the first power source, which may be 'switched-off' when the computing device moves from the first operational state to the second operational state. The cryptographic engine is arranged to encrypt data stored in the non-volatile memory cells, when the computing device is in a second operational state, which is a relatively lower powered state, thus securing data in the non-volatile memory which persists after the computing device has powered down. In this example, the data stored in the non-volatile memory cells is secured. This protects the data if, for example, the non-volatile memory module is obtained by an attacker that wishes to gain access to secured information written into the non-volatile memory cells, even if the non-volatile memory module becomes decoupled from the computing device. When the system is returned to the first operational state, or to a new, third operational state, which is distinct from previous operational states, the data stored in the non-volatile memory cells is decrypted. For example, in one scenario, the data that is stored in the non-volatile memory cells is decrypted when the computing device is brought into a relatively higher powered state, such as when the device is switched on or brought out of a sleep or hibernate mode, given appropriate authorization or user credentials, such as a password. Alternatively a key may be secured in a Trusted Platform Module of known kind.

In one example, decryption operations are performed on the encrypted data when the data is read from the non-volatile memory cells. In another case, one or more decryption operations may be performed by pipelining data to be decrypted via the cryptographic engine, or by starting a decryption operation on data which is likely to be needed first. This could, for example, be in response to the device changing operational state, such as being brought out of a sleep or hibernate state, or being powered or booted up or such like. In another example, cryptographic operations such as encryption or decryption operations are performed in parallel.

In an alternative example, a non-volatile memory device containing a non-volatile memory module is arranged to change from a first operational state to a second operational state. In one case, the non-volatile memory device is arranged to detect a change in operational state due to an external change, such as being disconnected from a computing device, or, alternatively, by detecting physical intrusion. Similarly to previously-described examples, when in the second operational state, a cryptographic engine coupled to the non-volatile memory module in the non-volatile memory device may be powered by a second power source in order to perform one or more cryptographic operations, such as encrypting the data stored in the non-volatile memory cells. The second power source may be independent of a first power source, which powered the non-volatile memory device during the first operational state. For example, the non-volatile memory device may have been powered through its connection to a computing device during the first operational state.

In other examples, the memory may comprise volatile memory and the cryptographic engine may be arranged, for example, to encrypt data that is stored in the volatile memory when a change of operational state of a respective system is detected. With volatile memory, of course, the change of operational state would not include a power-off state of the volatile memory as the memory would need power in order to function. The change of operational state may therefore be, for example, a switch to a relatively lower power mode (as distinct from a power-off mode), a change to a security level or a perceived change of risk, as will be described hereinafter.

FIG. 1 is a simplified schematic diagram of a system 100 according to an example. The system 100 shown in FIG. 1 comprises a computing device 110 connected in this instance to a non-volatile memory module 120. The non-volatile memory module 120 shown in FIG. 1 may be a module internal to a computing device or, alternatively, may be a module within a non-volatile memory device coupled to the computing device 110. In the example shown in FIG. 1, the non-volatile memory module 120 is arranged to store data in one or more non-volatile memory cells 130 (of which three are shown) in response to receiving data from the computing device 110. According to examples described herein, the non-volatile memory module 120 can be implemented as a single or a multi-chip component. The module may be an embedded hardware chip or chips. Alternatively, in another example, the non-volatile memory module is a detachable module comprising one or more chips.

Initially, a system such as system 100 shown in FIG. 1 is operating in a first operational state. The operational state of system 100 may relate to either one, or both, of the computing device 110 and non-volatile memory module 120 or, in certain other cases, components of the computing device 110 or non-volatile memory module 120. The non-volatile memory module 120 may comprise a cryptographic engine 140 which is communicatively coupled to the non-volatile memory cells 130. The cryptographic engine 140 has read and write access to data stored in the non-volatile memory cells 130.

According to an example, the cryptographic engine 140 can be implemented as a hardware-based module within the non-volatile memory module 120. In such a case, the cryptographic engine 140 may comprise a microprocessor or microcontroller component, for example, with its own addressable memory (not shown), which can be used during cryptographic operations. Alternatively, space may be reserved in the non-volatile memory cells 130 for performing cryptographic operations on data that is stored elsewhere in the non-volatile memory cells 130. In any event, the microprocessor is arranged to execute program code for implementing cryptographic operations on data stored in the one or more non-volatile memory cells 130.

According to a second example, the cryptographic engine 140 is implemented as software or firmware in the non-volatile memory module 120. In that case, the cryptographic engine 140 may be replaced by a general purpose processing unit. In such a case, the general purpose processing unit may be arranged to access memory in the non-volatile memory module 130, storing program code for implementing the one or more cryptographic operations. Other examples may deploy a combination of hardware, software and/or firmware to implement the one or more cryptographic operations.

In the system 100 shown in FIG. 1, the cryptographic engine 140 and the non-volatile memory cells 130 are connected to a control component 150. According to an example, the control component 150 comprises circuitry within the non-volatile memory module 120, which is sensitive to a change of operational state of the system. The control component also provides an interface to a computing device 110 of the system. In particular, via the connection with the computing device 110, the control component 150 is arranged to detect when the system 100 changes from a first operational state to a second operational state. For example, in one case, the control component 150 is arranged to detect a change of voltage in the connection between the computing device 110 and the non-volatile memory module 120. In such a case, the change of voltage may be in response to a computing device 110, in which the non-volatile memory module 120 is embedded, switching to a lower power mode or the non-volatile memory module 120, in a non-volatile memory device, becoming disconnected from the computing device 110.

The cryptographic engine 140 is coupled to the control component 150 and is controllable by the control component in response to the control component 150 detecting a desired or actual change of operational state of the system 100 from a first operational state to a second operational state. For example, the control component may be responsive to a software 'eject' request, in advance of the computing device 110 becoming disconnected from the non-volatile memory module 120. Alternatively, if the non-volatile memory module has an alternative power supply (as described below in more detail), the control component 150 may respond to the attendant drop in voltage as the power supply becomes disconnected. The cryptographic engine 140, in response, may read data from the non-volatile memory cells 130 into its own memory (not shown) and perform one or more cryptographic operations on the data (or a portion of that data). After performing the one or more cryptographic operations, the cryptographic engine 140 may then write the modified data back into the non-volatile memory cells 130. According to an example, cryptographic operations may be performed at differing levels of security for different portions of the data stored in the non-volatile memory cells. For example, a first portion may remain unencrypted, a second portion may be encrypted with a 128-bit key and a third portion may be encrypted with a 256-bit key. In one case, the level of security used to encrypt portions of data could be based on, for example, a desired level of accessibility to the data.

In certain examples, the cryptographic engine 140 accesses the data stored in the non-volatile memory cells 130 in blocks of bytes, in single bytes or even in bits, and performs cryptographic operations on that data, before executing further cryptographic operations on data stored in the non-volatile memory cells 130. In another case, the cryptographic engine 140 is arranged to access bytes in a non-sequential fashion, for example, whereby one or more cryptographic operations may be performed in parallel on data stored in separate cells. In yet another example, a change of operational state of the system could comprise an indication from the computing device 110 to lock a single block (or an identified block or blocks) of a non-volatile memory cell 130. In such a case, the cryptographic engine 140 is arranged to access the single memory cell from the non-volatile memory cells 130 and perform cryptographic operations on the data stored in the memory cell.

In some examples, the cryptographic engine 140 is arranged to implement conventional cryptographic functions such as encryption/decryption, authentication, verification, data integrity checks and cryptographic hashes on data stored in the non-volatile memory cells 130. In the case of encryption/decryption operations the cryptographic engine 130 accesses a key stored in the non-volatile memory module 120 to encrypt or decrypt data. The key could be a manufacturer's key stored in a tamper-proof sector of the non-volatile memory module 120, or it could be a user key loaded on to, and retrieved from, the computing device 110.

Figure 2:
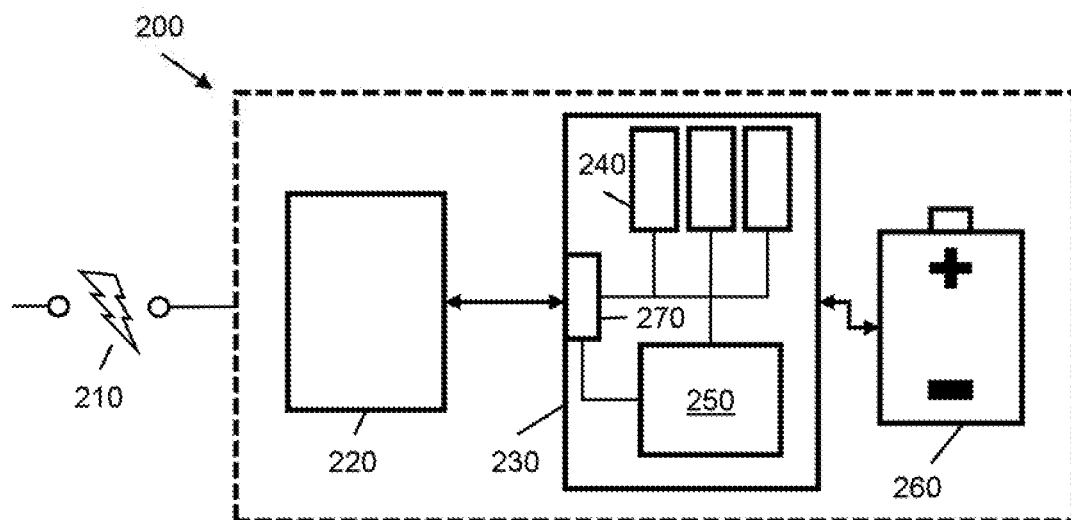
FIG. 2 is a schematic diagram of a system coupled to a power supply for securing data in a memory module according to another example.

FIG. 2 is a schematic diagram of a system 200 according to an example. In FIG. 2, system 200 is shown connected to a first power supply 210. The system 200 comprises a computing device 220 coupled in this instance to a non-volatile memory module 230, similar to the equivalent components of system 100 shown in FIG. 1. The non-volatile memory module 230 comprises one or more non-volatile memory cells 240 (three being shown, as before) and a cryptographic engine 250 communicatively coupled to the one or more non-volatile memory cells 240. As with system 100, shown in FIG. 1, the non-volatile memory module 230 may be a component of the computing device 220 or, alternatively, may be a component of a non-volatile memory device (not shown) coupled to the computing device 220. The cryptographic engine 250 is arranged to access data stored on the non-volatile memory cells 240 in response to a change of operational state of the system 200. The non-volatile memory module 230 is connected to second power supply 260. The second power supply 260 is arranged to supply power to components of the non-volatile memory module 230 during a second operational state of the system 200. A first operational state of the system 200 corresponds to a state in which the computing device is powered on and in which the power supplied to the non-volatile memory module 230 is from the first power supply 210. A second operational state of the system corresponds to a state in which the computing device 220 is no longer being supplied with power from the first power supply 210. Similarly to the non-volatile memory module 100 in FIG. 1, the non-volatile memory module 230 in FIG. 2 comprises a control component 270, which operates as an interface with the computing device and is arranged to detect a change of operational state of the system 200. The control component may, for example, comprise threshold-detection circuitry (not shown) of known kind that switches automatically to the second power supply 260 if a drop in voltage due to a loss of power from the first power supply 210 is detected. Alternatively, the circuitry may reside within the second power supply itself. In any event, in the present case, when a change of operating state is detected, the control component 270 is arranged to control the cryptographic engine 250, using power from the second power supply 260, to read the data in the one or more non-volatile memory cells 240 and execute one or more cryptographic operations on the data. Following execution of the one or more cryptographic operations on the data, the cryptographic engine 250 is arranged to write the data back into the one or more non-volatile memory cells 240.

Alternate configurations of the components of the system 200 shown in FIG. 2 are possible. For example, in one case the computing device 220 has a first power supply 210 and the non-volatile memory module 230 derives power directly from the connection with the computing device. This could be the case in, for example, a laptop computing device containing a non-volatile memory module similar to the non-volatile memory module 230. In this case, the operational state of system 200 corresponds to one or more power states of the computing device 220. For example, a first operational state corresponds to a state in which the computing device is powered on and deriving power from the first power supply 210. For example, the computing device may be a mobile device or laptop computer and the first power supply may be a lithium ion battery powering the computing device. A change of operational state of the computing device corresponds to the computing device entering a relatively lower powered mode of operation. For example, the computing device may enter a hibernate mode (suspend to disk) or a sleep mode (suspend to RAM). In such an instance, the control component 250 is arranged to detect a change of voltage of the computing device. The cryptographic engine is controlled by power from the second power supply, and executes one or more cryptographic operations of data stored in the one or more non-volatile memory cells at the time of change of operational state of the computing device.

In an alternative embodiment, the operational state of the system 200 corresponds to a power state of the non-volatile memory module 230. A first operational state of the system 200 corresponds to a state in which the non-volatile memory module 230 had derived power from the second power supply 260 in order to encrypt the stored data (for example, in response to a previous change of operational state in which the system 200 was powered by the first power supply). Subsequently, the system 200 changes operational state to a power state in which the system is being supplied with power from the first power supply. In response, the cryptographic engine 250 may then be arranged to perform one or more cryptographic operations on the data stored in the one or more non-volatile memory cells 240. For example a first cryptographic operation on data stored in the non-volatile memory cells 240 may comprise an encryption operation in an operational state of the system in which power is being supplied by the second power supply. In response to the system changing operational state, to a power state in which power is being supplied by the first power supply 210, the cryptographic engine 250 may perform one or more decryption operations.

A typical example of the foregoing is a situation in which data stored in the non-volatile memory module of a laptop computer that is connected to a mains supply becomes disconnected from the mains power supply. Responsive to the change of state of the laptop computer, the cryptographic engine performs encryption operations on the data stored in the non-volatile memory cells, where the encryption operations are supported by power from the battery module in the laptop computer. When the laptop computer is reconnected to the mains power supply, the cryptographic engine performs decryption operations on the encrypted data in the non-volatile memory cells, supported by the mains power supply.

In instances in which a second power supply is provided, the power supply may comprise a rechargeable battery. The battery may then recharge during the first operational state. Alternatively, the second power source may comprise a plurality of batteries, supercapacitors, a mains power source or other kinds of alternative power sources.

Figure 3:
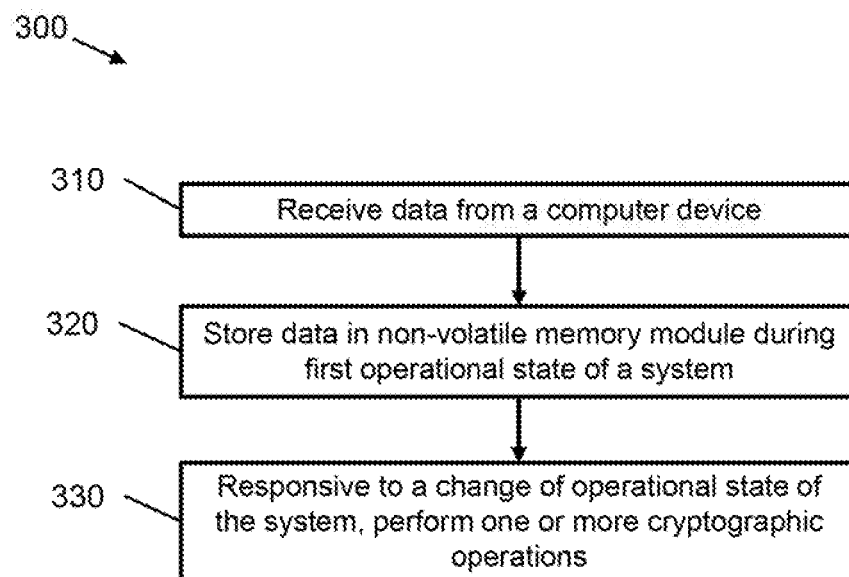
FIG. 3 is a schematic diagram illustrating a method for securing data stored in a memory module according to an example.

FIG. 3 illustrates a method 300 according to an example, of performing one or more cryptographic operations on data stored, in this instance, in non-volatile memory cells of a non-volatile memory module. The method 300 of FIG. 3 may be used in conjunction with the systems 100 and 200 shown in FIGS. 1 and 2.

At block 310, data is received from a computer device. For example, the computing device 110 shown in FIG. 1 is arranged to send data which is received by the non-volatile memory module 120. In one example, the non-volatile memory module arranged to receive data may be a non-volatile memory module in the computing device itself. Alternatively a device arranged to receive the data may be a non-volatile memory device comprising one or more non-volatile memory modules. For example, the non-volatile memory device may be a removable medium such as a 'USB stick' or portable 'flash drive'. In yet further examples, data is received over a remote or networked connection from a computing device e.g. over a wireless connection, a LAN, a Bluetooth connection or a mobile network connection to a second device which comprises non-volatile memory.

At block 320 data is stored in non-volatile memory during a first operational state of a system, the system comprising the computing device and the non-volatile memory. The data may be stored without the use of any kind of encryption (although it is anticipated that certain software applications may already have applied security measures such as encryption—for example as a result of password protection). When the method 300 is used in conjunction with the systems 100 and 200 shown in FIGS. 1 and 2, the non-volatile memory comprises a non-volatile memory module (130, 230) having one or more non-volatile memory cells (130, 240). The non-volatile memory stores the data when the system is in a first operational state. In one case, the first operational state is characterized by one or more components of a system implementing method 300 receiving power from a first power supply such as system 200 receiving power from the first power supply 210 shown in FIG. 2. Furthermore read/write operations, including receiving data from the computing device may be executed during the first operational state of the system in the method 300 shown in FIG. 3.

At block 330, one or more cryptographic operations are performed in response to a change of operational state of the system. According to an example, the cryptographic operations may comprise encryption operations or decryption operations. If used in conjunction with the systems 100 and 200 shown in FIGS. 1 and 2, the change of operational state of the system is detected by a control component located in the non-volatile memory module. In general, the method 300 can be implemented on a system comprising, for example, multiple non-volatile memories and in which the detection of the change of operational state of the system is with respect to one of the non-volatile memories in the system. According to an example, the step of performing one or more cryptographic operations is executed on a component similar to the cryptographic engines (140, 250) shown in FIGS. 1 and 2. As previously indicated, the cryptographic operations are performed by a general purpose processor and memory located in, or peripheral to, the non-volatile memory where data has been stored. In any case, a hardware or software component capable of performing the one or more cryptographic operations is arranged to access data stored on the non-volatile memory and execute the cryptographic operations. The cryptographic operations may comprise one or more of encryption/decryption, authentication, verification, data integrity checks and cryptographic hashes on data stored in the non-volatile memory. For example, in one case, an encryption algorithm such as AES is implemented.

Figure 4:
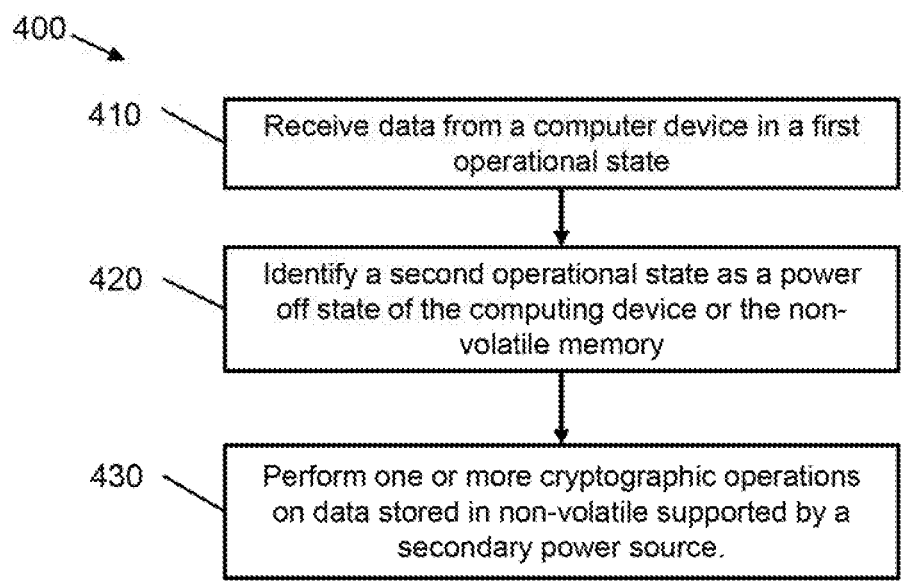
FIG. 4 is a schematic diagram illustrating a method of identifying a change of operational state of a system according to an example.

FIG. 4 shows a method 400, according to an example, of performing cryptographic operations on data stored, in this instance, in non-volatile memory of a system. The method 400 may be used in conjunction with the systems 100 and 200 shown in FIGS. 1 and 2, and also in conjunction with the method 300 shown in FIG. 3. At block 410 data is received from a computing device that is operating in a first operational state of a system. The data may be received directly by a non-volatile memory module in the computing device or, alternatively, by a second device that is connected to the first computing device (either locally or remotely) such as a non-volatile memory device comprising a non-volatile memory module. The data can be sent via any number of mediums. For example, in the case where data is being sent between two devices, which are remotely connected, the data may be sent over a LAN, a wireless network or connection, such as a Bluetooth connection or the like. In another case, the data is received at a device comprising a non-volatile memory module such as a USB stick or a removable disk drive, for example, a flash memory. In yet another case, the data is received over a high speed bus and stored in one or more dual inline memory modules (DIMM). As previously described an "operational state" can relate a state in which the system is receiving power from a first power supply. In one example, in relation to the method 400 shown in FIG. 4, "first operational state" relates a state of the system in which the system is powered by a first power supply, similar to the system 200 receiving power from the power supply 210 shown in FIG. 2, during a first operational state.

At block 420 a second operational state is identified as a "power off" state of the computing device or the non-volatile memory. In an example of the method 400 being used in conjunction with the system 200 shown in FIG. 2, the "power off" state is as a result of the system 200 being disconnected from the power supply 210. In this case, the power state of the computing device 220 or non-volatile memory module 230 is a relatively low power state, for example, as a result of the system 200 being disconnected from the power supply 210. As previously described, the control component 270 is arranged to be responsive to the change of power state of the system and, in response, to switch operation of the non-volatile memory module to the secondary power source 260.

At block 430, one or more cryptographic operations are performed on data stored in non-volatile memory using power from a secondary power source. The cryptographic operations may comprise one of encryption or decryption operations. In one case, the method 400 may be used where the secondary power source is a battery module coupled to a non-volatile memory module or a non-volatile memory device containing a non-volatile memory module. The battery module may contain batteries which may be replaceable (when discharged), chargeable and/or rechargeable. In this case, in response to the detection that the power state of the system has changed from an "on" state to an "off" state the battery module takes over as a power supply to power a device capable of carrying out cryptographic operations on data stored in the non-volatile memory. In particular, a system implementing the method 400 may be arranged to encrypt data held in non-volatile memory of a device from a secondary, rechargeable battery module according to an example. Similarly, when a primary or first power supply becomes available again to the system, representing a detected change of operational state, the system can execute the method 400 again but instead decrypting the encrypted data that had been stored in the non-volatile memory.

Alternative examples may operate according to changes in different kinds of operational states. For example, a first operational state may be defined as a relatively secure operating state whereas a second operational state may be defined as a relatively insecure operating state. A secure operating state may be when a computing device, such as a computer or handheld device, is not connected to a network of any kind. In such a state the risk of remote attack may be perceived to be relatively low compared to when the computer or device is 'online' and connected to a network. Then, when the computer or device is connected to a network, this may trigger the switch to operation according to the second operational state, in which data in certain non-volatile memory is encrypted according to embodiments of the present invention. A similar scheme may be deployed when, for example, a laptop computer is 'docked' into a docking station that is connected to a wired LAN or such other network, which can be used to communicate with the laptop computer. Operation according to other, different kinds of security-based operational states is envisaged. Still other kinds of operational state may relate to a location of a computing device. For example, encryption may not be deployed (in a first operational state) in relatively safe environments, such as in a secure office environment or at home, whereas it may be deployed (in a second operational state) when in a public environment, as the risk is greater that the computer or device may be stolen or otherwise misused.

All of the aforementioned alternative examples would apply equally to both volatile and non-volatile memory types.

In the embodiments that are described with reference to FIG. 1 and FIG. 2, a control component 150, 270 is described as a component within a non-volatile memory module, which is adapted and arranged to determine a change of operational state of the memory module. In alternative embodiments, a part or all of the functionality of the control component may reside outside of the non-volatile memory module. For example, a circuit that detects when mains power is lost, and controls when to draw power from a battery, may reside within a laptop computer or any other device that can operate on either mains or battery power. That same circuit (that is, outside of the non-volatile memory module) may be used to control the operation of a cryptographic engine, without needing to reproduce all or at least a part of the circuitry within the non-volatile memory module.

Methods and systems described herein provide a means of securing data held in non-volatile memory in response to a change of operational state of a system deploying non-volatile memory. Examples of the system provide an improved means of securing data which persists in non-volatile memory when, for example, the system loses power, by providing secondary power to a cryptographic engine coupled to the non-volatile memory. In contrast to previously known methods, this reduces the burden of securing data during operation of a computing device executing read and write operations into the non-volatile memory. The system protects data against the realistic threat of memory being stolen from the system or attacked when the computing device writing to the memory is not in use, yet avoiding the performance penalties of in-line encryption.

Figure 5:
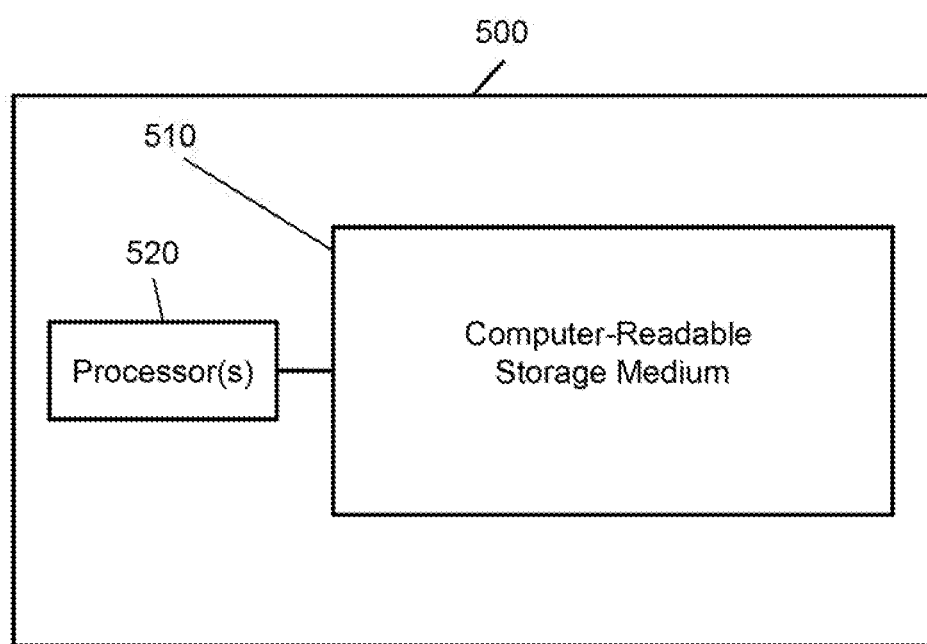
FIG. 5 is a schematic block diagram of a computer system according to an example.

Certain methods and systems as described herein may be implemented by one or more processors that processes program code that is retrieved from a non-transitory storage medium. FIG. 5 shows an example 500 of a device comprising a machine-readable storage medium 510 coupled to at least one processor 520. Machine-readable media 510 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 5, the machine-readable storage medium comprises program code to effect one or more cryptographic operations for securing data stored in non-volatile memory. According to an example, the device 500 comprises a number of separate, distributed devices communicatively coupled to one another and processors 520 are distributed across the plurality of devices.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed

The invention claimed is:

1. A system comprising:
a first power supply;
a backup power supply;
a computing device;
a non-volatile memory module to store, without use of encryption, data received from the computing device during a first operational state of the system in which the non-volatile memory module is powered by the first power supply; and
a cryptographic engine comprising a hardware processor, wherein the cryptographic engine is to, in response to a change of an operational state of the system from the first operational state to a different second operational state in which power of the first power supply is removed from the non-volatile memory module and the cryptographic engine:
encrypt, using a first key of a first length, a first portion of the data that is stored without use of encryption in the non-volatile memory module, and
leave unencrypted a second portion of the data that is stored without use of encryption in the non-volatile memory module,
encrypt, using a second key of a different second length, a third portion of the data stored without use of encryption in the non-volatile memory module, wherein the cryptographic engine is to perform the encrypting of the first portion in a first part of the non-volatile memory module in parallel with the encrypting of the third portion in a second part of the non-volatile memory module, and
wherein the cryptographic engine is to encrypt the first portion of the data that is stored in the non-volatile memory module while the cryptographic engine is powered by the backup power supply.

2. The system of claim 1, wherein the cryptographic engine is included in the non-volatile memory module.

3. The system of claim 1, wherein the second operational state is a power-off state.

4. The system of claim 3, wherein the backup power supply includes a rechargeable power source that is rechargeable during the first operational state.

5. The system of claim 1, wherein the cryptographic engine is to decrypt at least a portion of encrypted data in the non-volatile memory module in response to a change of the operational state of the system from the second operational state to the first operational state or a third operational state.

6. The system of claim 5, wherein the cryptographic engine is to decrypt the at least a portion of the encrypted data in the non-volatile memory module by pipelining the at least a portion of the encrypted data.

7. A method comprising:
receiving data from a computing device;
storing the data without use of encryption to a non-volatile memory module during a first operational state of a system comprising the computing device and the non-volatile memory module, wherein during the first operational state the non-volatile memory module is powered by a first power supply; and
responsive to a change in an operational state of the system from the first operational state to a different second operational state:
encrypting, by a cryptographic engine comprising a hardware processor, a first portion of the data stored without use of encryption in the non-volatile memory module using a first key of a first length, and
encrypting, by the cryptographic engine, a second portion of the data stored without use of encryption in the non-volatile memory module using a second key of a different second length, wherein the cryptographic engine performs the encrypting of the first portion in a first part of the non-volatile memory module in parallel with the encrypting of the second portion in a second part of the non-volatile memory module,
wherein during the second operational state, power of the first power supply is removed from the non-volatile memory module and the cryptographic engine, and wherein the encrypting of the first portion and the second portion is performed while the cryptographic engine is powered by a backup power supply.

8. The method of claim 7, wherein the cryptographic engine is included in the non-volatile memory module.

9. The method of claim 7, wherein the first operational state and the second operational state are different power states of one or more of the non-volatile memory module and the computing device.

10. The method of claim 7, wherein the second operational state is a lower power state than the first operational state.

11. The method of claim 10, wherein the second operational state is a power-off state.

12. The method of claim 7, wherein the backup power supply includes a rechargeable power source rechargeable during the first operational state.

13. The method of claim 7, further comprising decrypting, by the cryptographic engine, at least a portion of encrypted data in the non-volatile memory module in response to a change in the operational state of the system from the second operational state to the first operational state or a third operational state.

14. A memory module, comprising:
   non-volatile memory cells;
   a cryptographic engine comprising a hardware processor; and
   an interface to detect an operational state transition of a system to which the memory module is coupled or in which the memory module is part of,
   wherein the memory module is operable to store in the non-volatile memory cells, without use of encryption, data received by the memory module during a first operational state of the system in which the memory module is powered by a first power supply, and
   wherein the cryptographic engine is to, in response to the operational state transition being from the first operational state to a different second operational state:
      encrypt a first portion of the data stored without use of encryption in the non-volatile memory cells using a first key of a first length, and
      encrypt a second portion of the data stored without use of encryption in the non-volatile memory cells using a second key of a different second length, wherein the cryptographic engine is to perform the encrypting of the first portion in a first subset of the non-volatile memory cells in parallel with the encrypting of the second portion in a second subset of the non-volatile memory cells,
   wherein during the second operational state, power of the first power supply is removed from the memory module and the cryptographic engine, and wherein the cryptographic engine is to encrypt the first portion and the second portion of the data stored in the non-volatile memory cells while the cryptographic engine is powered by a backup power supply.

15. The system of claim 2, wherein the non-volatile memory module comprises an interface to detect a transition between the first operational state and the second operational state based on detecting a change of a voltage in a connection between the computing device and the non-volatile memory module.

16. The system of claim 15, wherein the interface is to detect a transition from the first operational state to the second operational state based on detecting a drop in the voltage.

17. The method of claim 7, comprising:
   detecting the change in the operational state of the system from the first operational state to the second operational state based on detecting a change of a voltage in a connection between the computing device and the non-volatile memory module.

18. The method of claim 17, comprising:
   detecting a transition from the first operational state to the second operational state based on detecting a drop in the voltage.

19. The memory module of claim 14, wherein the interface is to detect the operational state transition from the first operational state to the second operational state based on detecting a change of a voltage in a connection between the memory module and a computing device.

* * * * *